United States Patent [19]

Priaroggia

[11] Patent Number: 4,836,641
[45] Date of Patent: Jun. 6, 1989

[54] SUBMARINE OPTICAL FIBER LINE WITH INTERCONNECTED DIFFERENT CABLE TYPES

[75] Inventor: Paolo G. Priaroggia, Milan, Italy

[73] Assignee: Societa' Cavi Pirelli S.p.A., Milan, Italy

[21] Appl. No.: 217,565

[22] Filed: Jul. 11, 1988

[30] Foreign Application Priority Data

Jul. 27, 1987 [IT] Italy ................................ 21448 A/87

[51] Int. Cl.$^4$ ............................ G02B 6/44; H02G 3/00
[52] U.S. Cl. ................................ 350/96.23; 350/96.20;
350/96.21; 174/70
[58] Field of Search ............... 350/96.20, 96.21, 96.22,
350/96.23; 174/70 R, 70 S

[56] References Cited

U.S. PATENT DOCUMENTS

| | | | |
|---|---|---|---|
| 4,172,212 | 10/1979 | Heinzer | 174/70 S X |
| 4,505,540 | 3/1985 | Furusawa et al. | 350/96.20 |
| 4,630,888 | 12/1986 | Dubar | 350/96.23 |
| 4,632,507 | 12/1986 | Mignien et al. | 350/96.23 |
| 4,676,590 | 6/1987 | Priaroggia | 350/96.23 |
| 4,690,498 | 9/1987 | Priaroggia | 350/96.23 |
| 4,697,875 | 10/1987 | Priaroggia | 350/96.23 |
| 4,699,459 | 10/1987 | Priaroggia | 350/96.21 |
| 4,717,232 | 1/1988 | Priaroggia | 350/96.20 |
| 4,725,121 | 2/1988 | Priaroggia | 350/96.23 |
| 4,733,935 | 3/1988 | Gandy | 350/96.21 |
| 4,761,831 | 8/1988 | Davis et al. | 350/96.23 X |
| 4,767,173 | 8/1988 | Priaroggia | 350/96.20 |
| 4,784,482 | 11/1988 | Priaroggia | 350/96.23 |

FOREIGN PATENT DOCUMENTS

| | | | |
|---|---|---|---|
| 52-10590 | 1/1977 | Japan | 174/70 S |
| 57-19705 | 2/1982 | Japan | 350/96.23 |
| 57-78012 | 5/1982 | Japan | 350/96.23 |
| 57-89708 | 6/1982 | Japan | 350/96.23 |
| 58-156915 | 9/1983 | Japan | 350/96.23 |
| 62-91034 | 4/1987 | Japan | 174/70 S |

*Primary Examiner*—William L. Sikes
*Assistant Examiner*—Brian M. Healy
*Attorney, Agent, or Firm*—Brooks Haidt Haffner & Delahunty

[57] ABSTRACT

A submarine, optical fiber telecommunication line having optical fiber cables with external armor interconnected with optical fiber cables with only internal armor by opto-electronic repeaters and tubular bodies. The repeaters, the tubular bodies and the cables can withstand the tensile and hydrostatic stresses to which they are subjected during laying and after laying. At the shore ends, the repeaters are mechanically connected at one of their ends to cables with external armor. The other ends of the repeaters are mechanically connected to the tubular bodies which are mechanically connected to the sheaths and the internal armor of cables with only internal armor. The tubular body has an internal partition to which the internal armor is mechanically connected and has an internal sealing plug for preventing axial flow of water.

8 Claims, 1 Drawing Sheet

SUBMARINE OPTICAL FIBER LINE WITH INTERCONNECTED DIFFERENT CABLE TYPES

BACKGROUND OF THE INVENTION

The present invention relates to a submarine telecommunication line comprising optical fibers, which is formed by sections of submarine cables of the optical fiber type arranged in series with one another and between which opto-electronic repeaters of the transmitted signals are interposed.

As is known, in any submarine telecommunication line comprising optical fibers, the presence of a structure which is mechanically resistant to the tension stresses exerted on the line during its laying or during its recovery for possible repairs is essential. As used therein, "mechanically resistant" means that the identified element has a strength sufficient to withstand the identified stress or stresses. The components of this mechanically resistant structure of a submarine line are constituted by the tension resistant armors of the cables and of the opto-electronic repeaters.

The tension resistant armor for optical fiber submarine cables can be divided into two groups.

A first group of optical fiber submarine cables comprises those cables in which an armor, mechanically resistant both to the tension stresses imparted to it during laying and to the stresses due to the hydrostatic pressure on the laid cables, is arranged around the cable portion occupied by the optical fibers. In other words, the outer armor has a mechanical strength sufficient to withstand the stresses to which the cable is subjected.

A second group of optical fiber submarine cables comprises cables in which the mechanically resistant armor is surrounded by the optical fibers. In particular, in cables of this kind, the armor is only a rope which occupies the radially innermost portion of the cables. Moreover, they are provided only with a water-tight sheath, substantially devoid of any mechanical resistance to the stresses due to the hydrostatic pressure, since the resistance to the latter is obtained by filling any space inside the sheath which is free of other material with an incompressible fluid. See, for example, U.S. Pat. No. 4,690,498.

Also, the opto-electronic repeaters can be divided into two groups.

A first group comprises opto-electronic repeaters, the structure of which is such as to allow the anchoring to them only those cables in which the mechanically resistant armor surrounds the optical fibers.

In the opto-electronic repeaters belonging to this first group, the mechanically resistant structure is constituted by a water-tight envelope or metal casing which is provided at its two ends with elements for fastening the armors of two cables of the first group to which the repeater is connected.

The repeaters belonging to the first group have a simple and compact structure and have a resistance to damage which might be caused by impact with submerged bodies, such as, fishing nets and the like.

In fact, the repeaters belonging to the first group are provided with water-tight envelopes or metal casings of a thickness which ensures a high mechanical resistance, such envelopes or casings having a size which will withstand not only hydrostatic pressure but also the tension stresses exerted during the laying of the line.

A second group of opto-electronic repeaters is composed of repeaters having a structure able to allow the anchoring to them only of cables of the second group in which the mechanically resistant armor is constituted by a rope occupying the radially innermost portion and surrounded by the optical fibers.

In the opto-electronic repeaters belonging to the second group, the mechanically resistant structure is constituted by a tie-rod, or the like, which occupies the repeater's radially innermost portion. See, for example, my co-pending U.S. application Ser. No. 875,305 filed June 17, 1986, now U.S. Pat. No. 4,767,173. The opto-electronic components of the repeaters are positioned around the tie-rod and the whole is surrounded by a water-tight envelope except for the ends of the tie-rods which project in cantilever fashion from the ends.

In the opto-electronic repeaters belonging to the second group, each space inside the envelope free from other material is filled with an incompressible fluid, so that said envelope, by itself, has a small mechanical resistance. Consequently, these repeaters are likely to be damaged by impacts.

From the foregoing, it can be understood that the conventional submarine telecommunication lines comprising optical fibers are normally formed entirely by cables of the same kind, connected together by opto-electronic repeaters of the corresponding group.

In particular, said conventional lines are formed only by cables of the first kind connected together by opto-electronic repeaters belonging to the first group or only by cables of the second kind connected together by opto-electronic repeaters of the second group.

The already known submarine telecommunication lines comprising optical fibers have, at the same time, both advantages and drawbacks which will be considered hereinafter.

The already known submarine lines formed by cables of the first kind connected together by opto-electronic repeaters of the first group are extremely heavy, relatively inflexible and difficult to handle, and this causes difficulties in carrying out the laying operations.

Further, when the laying depth becomes greater, the weight of the line increases and its flexibility and handling are considerably reduced. In fact, an increased laying depth requires a corresponding increase in the size of the armor which, in the cables belonging to the first type, surrounds the cable portion occupied by the optical fibers because the tension stresses exerted on the line during its laying and the stresses due to the hydrostatic pressure applied to the cables are greater.

The same considerations can be applied to the opto-electronic repeaters belonging to the first group since the thickness of their mechanically resistant envelope is increased in accordance with the increase of the laying depth.

An advantage of the conventional submarine lines formed by cables of the first kind is that they are sufficiently resistant to the impacts due to fishing nets, and the like, by virtue of a substantial armor which surrounds the part of the line occupied by the transmission components.

However, the resistance to impacts is advantageous only in the submarine cable lengths laid in proximity to shores where the risk of impacts is high, whereas, as a practical matter, said risk does not exist for the remaining part of the line (greater line length by far) since it is laid in very deep areas where no substantial activity is expected. Consequently, with lines of the first kind, the above-described drawbacks in the laying operation is not eliminated.

The conventional submarine lines formed by cables of the second kind connected together by opto-electronic repeaters of the second group are, instead, light, flexible and easy to handle, and this facilitates the laying steps.

However, an inconvenience of these lines is that they can be easily damaged in the event of impacts against submarine bodies, such as, for example, fishing nets and the like.

SUMMARY OF THE INVENTION

The present invention has, as one object, the provision of a submarine telecommunication line comprising optical fibers which has all of the above-mentioned advantages of the lines already known, without however, having the corresponding inconveniences, such advantages being obtained by connecting opto-electronic repeaters of the first group both to optical fiber cables of the first kind and to optical fiber cables of the second kind.

In accordance with the invention, the submarine telecommunication line comprising optical fibers comprises at least one opto-electronic repeater of the transmitted signals and at least two optical fiber submarine cables between which said repeater is interposed and connected, the opto-electronic repeater being of the type provided with a water-tight envelope which is mechanically resistant to any stress imparted to it even during the laying of the line, said line being characterized in that at least one of the two submarine cables is of the type in which the mechanically resistant armor is a rope which occupies its radially innermost portion, and in that the connection between the opto-electronic repeater and the submarine cable of said type comprises a mechanically resistant tubular body which include a mechanically resistant partition, provided with through openings for the passage of the optical fibers and to which is secured the rope constituting the cable armor, said tubular body having one end provided with elements for mechanical anchoring it to the repeater envelope and the other end tightly applied to the sheath of the cable and hydraulic sealing means being housed in said mechanically resistant tubular body.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DETAILED DESCRIPTION OF THE INVENTION

Figure 1:
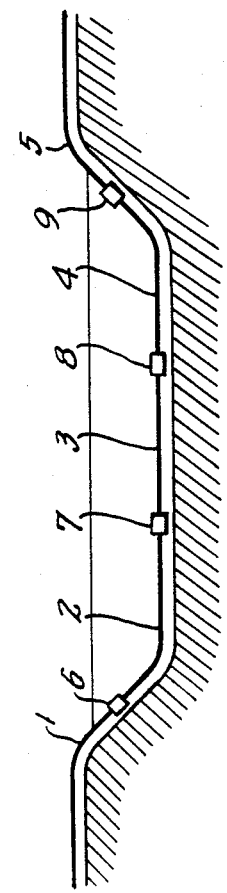
FIG. 1 illustrates diagrammatically a line according to the invention.

A submarine telecommunication line comprising optical fibers in accordance with the invention is illustrated schematically in FIG. 1 and comprises a plurality of lengths of optical fiber cables 1, 2, 3, 4 and 5 in series and connected together by opto-electronic repeaters 6, 7, 8 and 9.

The lengths of optical fiber cables indicated by the reference numerals 1 and 5 are known per se and are of a first type in which the mechanically resistant armor surrounds the cable portion containing the optical fibers, whereas the cable lengths indicated by reference numerals 2, 3 and 4 are known per se and are of a second type in which the mechanically resistant structure of the cable is constituted only by a rope disposed at the radially innermost cable portion and, therefore, internal to the cable zone where the optical fibers are located.

All the opto-electronic repeaters 6, 7, 8 and 9 of the line are known per se and belong to the first group which has a water-tight envelope which is mechanically resistant to any stress exerted on the line even during its laying. Therefore, the envelope is mechanically resistant to the tension stresses exerted during the laying operation and to the hydrostatic pressure exerted on the line when it is laid.

The opto-electronic repeaters 6–9 are provided at both ends of their mechanically resistant envelope with elements for connecting to it the mechanically resistant armors of the cables of the first kind, in which said mechanically resistant armor surrounds the cable portion containing the optical fibers.

Consequently, the connections between the cables 1 and 5, which are of the above-described first kind, and the opto-electronic repeaters 6 and 9, are carried out with conventional systems and means, and such connections need not be illustrated in the drawings and described herein.

On the other hand, the connection between an optical fiber cable of the second kind, in which the mechanically resistant armor is constituted only by a rope situated at the radially innermost cable portion, and an opto-electronic repeater of the first group provided with a water-tight envelope mechanically resistant to the stresses applied to the repeater, is effected through connection means, hereinafter described, which is an essential element for the line according to the invention.

The connection means comprises, in general, a tubular body mechanically resistant to at least the tension stresses exerted on one line during laying.

One end of the tubular body is connected to one end of the envelope of the opto-electronic repeater by the anchoring elements which normally connect one end of the repeater to the external armor of the cables belonging to the first type.

The tubular body contains, secured to it and arranged transversely to its cavity, a partition provided with through openings in its wall for the passage of the optical fibers of the cable or of the repeater.

The partition is mechanically resistant, i.e. can withstand the tensile stresses to which the cable attached thereto is subjected, and the end of the rope constituting the mechanically resistant armor of the optical fiber cable of the second type, which is its sole armor and is situated at the radially innermost cable portion, is connected to the partition.

The other end of the tubular body is tightly secured to the cable sheath, and a sealing means is housed inside the tubular body.

Figure 2:
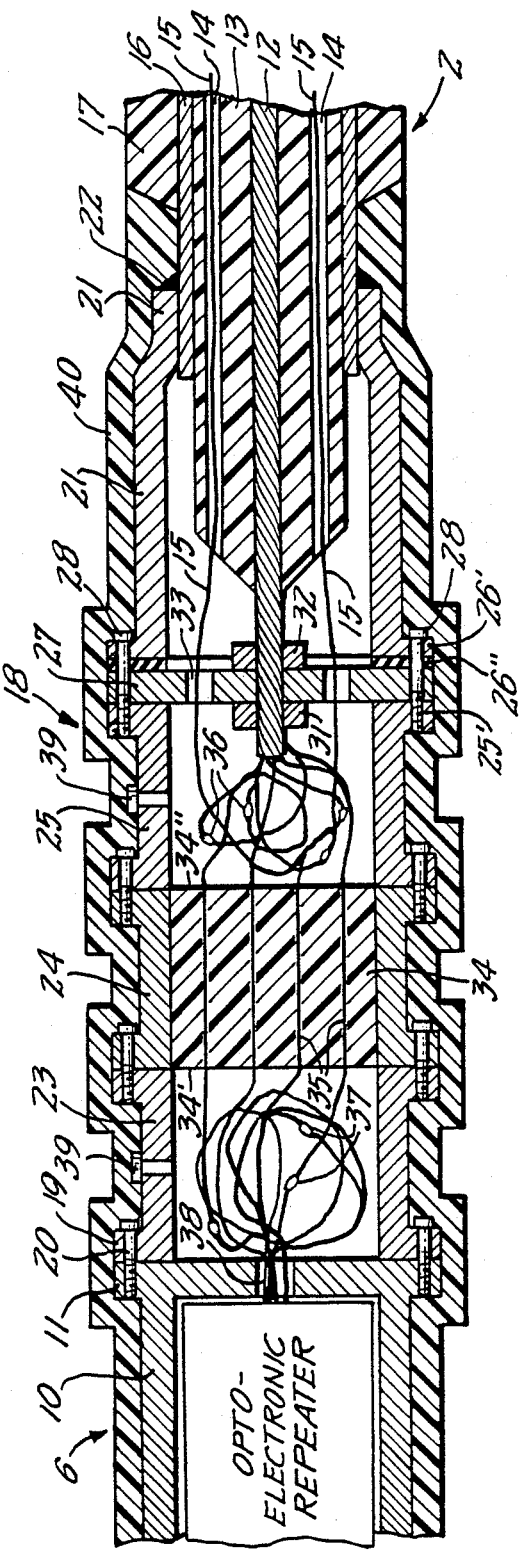
FIG. 2 shows, in axial section, the connection between one end of a cable and an opto-electronic repeater.

FIG. 2 illustrates, as an example, one preferred embodiment of a connection, described in detail hereinbelow, between the optical fiber cable 2 of the second type, in which the mechanically resistant armor is only a rope 12 which occupies the radially innermost portion of the cable 2, and the opto-electronic repeater 6 of a type provided with a water-tight envelope 10 mechanically resistant to any stress applied even during the laying of the line.

FIG. 2 illustrates schematically only a part of the end of the opto-electronic repeater 6, since it is of a type known per se. A flange 11, only one of which is illustrated, is present at each end of the envelope 10. This flange 11 represents the element to which, in the conventional lines, the mechanically resistant armor of the cables of the first type is secured.

The cable 2 is merely representative of a centrally armored cable and comprises, around rope 12, a core 13 of plastic material having small tubes 14, which loosely receive optical fibers 15. Said core 13 is surrounded by sheath 16 made, for instance, of metallic material and having only the function of a hydraulic seal. Externally, the metal sheath 16 is provided with a covering 17 of plastic material.

As can be seen in FIG. 2, the end of the cable 2 has its own components bared stepwise. In particular, the end of the rope 12 and the ends of the optical fibers 15 extend from the plastic core 13.

A mechanically resistant tubular body 18 is interposed between the cable 2 and the opto-electronic repeater 6. One end of said body 18, comprises a flange 19, which is connected, for example, by bolts 20 to the flange 11 of the mechanically resistant envelope of the opto-electronic repeater 6. Such body 18 is capable of withstanding the stresses applied thereto by the repeater and the cable connected thereto and by the hydrostatic pressure of the water in which it is laid.

The other end, 21, of the mechanically resistant tubular body 18 is tightly secured, for example, by means of a weldment 22, to the metal sheath 16 of the cable 2.

The tubular body 18 is formed by several tubular sections 23, 24, 25 and 26, each of which is provided with end flanges, which are aligned with one another and mutually secured, such as by bolts.

Figure 3:
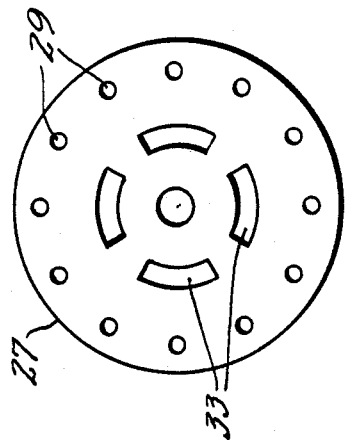
FIG. 3 shows, in end view, a partition forming part of the connection shown in FIG. 2.

The tubular sections 23, 24 and 25, the features of which will be described hereinafter, are connected directly to one another. However, a plate 27 is interposed between the tubular section 25 and the tubular section 26. The plate 27, shown in end view in FIG. 3, illustrates one particular embodiment of a partition, provided with through openings, which can be present in the cavity of the tubular body and which is part of the body.

The edge portions of plate 27 are interposed between flanges 25' and 26', bolts 28 passing through the holes 29 (FIG. 3) in the plate 27 and holes in the flanges 25' and 26' for connecting the plate 27 to the tubular sections 25 and 26 at the flanges 25' and 26' of the latter. Moreover, a packing 26" of an electrically insulating material is sandwiched between the flanges 26' and the plate 27.

The plate 27, at its axis, is provided with a through hole 30 through which passes the end of the rope 12 of the cable 2, and a pair of clamps 31 and 32, having exterior dimensions greater than those of hole 30, are clamped on the rope 12 at opposite sides of the plate 27, thereby mechanically connecting the rope 12 to the plate 27.

While the rope 12 is shown extending through the through hole 30 and is secured to the plate 27 by the pair of clamps 31 and 32, it is apparent that the rope 12 may be secured to the plate 27 in other ways which will apply any tension stresses on the rope 12 to the plate 27 and hence, to the tubular body 18.

The plate 27 also has through openings 33, through which, in the particular embodiment shown, the optical fibers 15 of cable 2 pass to allow the ends of said fibers 15 to be positioned in the space comprised between plate 27 and the tubular section 24.

Hydraulic sealing means are also present in the mechanically resistant tubular body. These sealing means have the purpose of preventing possible water traces which penetrate the cable 2 for any reason, for instance, through micro-cracks in the sheath, from reaching the opto-electronic components of the repeater and damaging them.

FIG. 2 illustrates one particular embodiment of the sealing means inside the mechanically resistant tubular body 18.

As previously stated, the mechanically resistant tubular body 18, between the plate 27 and the opto-electronic repeater 6, is formed by three tubular sections 23, 24 and 25, mutually aligned and connected.

Preferably, the internal cylindrical surface of the intermediate section 24 is knurled and tightly connected to the surface of a cylindrical body or plug 34 of polymeric material. The body 34, having a longitudinal length substantially equal to the length of the tubular section 24, is made, for example, of epoxy resin and has central portions of optical fibers 35 embedded therein, the end of the fibers 35 extending from the two axial ends 34' and 34" of the body 34.

Preferably, at least in the central zone of the lengths where the optical fibers 35 are embedded in the plastic material of body 34, said fibers 35 are devoid of the usual protective coverings of plastic material.

The ends of the optical fibers 35, protruding from the end 34" of the body 34, are connected at 36 with the optical fibers 15 of the cable 2. On the other hand, the ends of the optical fibers 35 which protrude from the end 34' of the body 34 are connected at 37 with the optical fibers 38 extending from the opto-electronic repeater 6.

Therefore, the tubular sections 23 and 25 have the function of enclosing the connections between the various optical fibers which ensure the joining of the optical fibers 15 of the cable 2 and the opto-electronic components of the repeater 6.

In particular, the tubular sections 23 and 25 contain rather long terminal portions of the optical fibers to be joined wound up in the form of skeins, so as to facilitate the connection of the fibers.

Moreover, any space free from other material inside the tubular sections 23 and 25 and any otherwise empty space inside the tubular section 26 are completely filled with a water-repellent grease.

To fill said spaces with the water-repellent grease, holes are provided in the walls of the tubular sections 23 and 25, which can be closed by plugs 39.

A covering 40 of polymeric material surrounds the tubular body 18 and the mechanically resistant envelope of the opto-electronic repeater 6. Said covering 40 is butt-joined to the covering 17, made of plastic material, of the cable 2.

Although a particular embodiment of the sealing means 34 encased in the mechanically resistant tubular body, and the position of hydraulic sealing means in the portion of said tubular body comprised between plate 27 and the opto-electronic repeater 6 has been described, it will be apparent that other sealing means as well as the shape of the sealing means can be different.

In fact, according to an alternative embodiment, not shown, the body 34 of polymeric material can be located in the portion of tubular body 18 between the plate 27 and the end of cable 2. Said alternative embodiment can be of any kind provided that the cylindrical surface of body 34 is tightly adherent to the surface of the cavity of said portion of the tubular body.

Further, with this alternative embodiment, the portion of tubular body 18 between plate 27 and the opto-electronic repeater 6 can be a single tubular section.

The connection illustrated in FIG. 2 has been described with specific reference to a connection between the cable 2 and the opto-electronic repeater 6. The connections of cables 2 and 3 with the opto-electronic repeater 7 (see FIG. 1), the connections of the cables 3 and 4 with the opto-electronic repeater 8 and the connection of cable 4 with the repeater 9 can be identical to that described and illustrated in FIG. 2 since all the cables 2, 3 and 4 are of the second type, namely, cables which have, as mechanically resistant structure, only a rope occupying the radially innermost cable portion.

On the other hand, the connections of the cables 1 and 5 with the opto-electronic repeaters 6 and 9, respectively, are of the known type since said cables 1 and 5 are of the first type, namely, cables having a mechanically resistant armor situated externally to the cable portion containing the optical fibers.

A line in accordance with the invention can also comprise electrical conductors for supplying power to the opto-electronic repeaters of the transmitted signals.

In the illustrated and described particular embodiment, one of the conductors is formed by the armors of both cables, the mechanically resistant tubular sections between the plate 27 and the opto-electronic repeater 6 and the envelope of the opto-electronic repeaters, whereas the other conductor is the sea in which the line is laid.

In an alternative embodiment, one of the conductors is formed by the armor of the first type cables, the envelopes of the repeaters and the sheaths of the second type cables. In this case, the insulating packing 26" is omitted, and electrically insulating coverings are provided for the clamps 31 and 32 and for the hole 30 of the plate 27. Also, in this alternative embodiment, the other conductor is the sea where the line is laid.

While two particular examples of electric conductors intended to supply the opto-electronic repeaters have been described, it will be apparent that the conductors can be provided in other ways.

From the description of a line according to the invention given hereinbefore and from the following considerations, it can be seen that the invention achieves the objects of the invention.

The particular connection means, constituting an essential element in a line according to the invention, allows the connection of cables of the second type, namely, those cables having a mechanically resistant armor which consists only of a rope situated in the radially innermost cable portion, with opto-electronic repeaters provided with a sealing envelope mechanically resistant also to the stresses encountered during the laying operation.

Further, the connection means of the invention obtains this result by their engagement with the elements present on the repeater envelope, by which it is possible to fasten thereto the mechanically resistant armors of cables of the first type, namely, cables in which the armor surrounds the optical fiber contained therein.

It follows that such connection means make possible the provision of a submarine line, comprising optical fibers, in which both types of optical fiber cables are present, together with opto-electronic repeaters only of the type provided with a sealing envelope mechanically resistant to mechanical stresses.

Consequently, submarine lines can be obtained, which are more protected against the damages they might suffer in the event of impacts against submerged bodies, since in the lengths where this risk exists, the line can be formed by cables of the first type, which are more resistant to the impacts. At the same time, the remainder of the line is light, flexible and easily handled since the remainder comprises cables of the second type having said features and constitute the greater part of the line which is disposed where the risk of damages due to impacts is small.

Although preferred embodiments of the present invention will be described and illustrated, it will be apparent to those skilled in the art that various modifications may be made without departing from the principles of the invention.

The embodiments of the invention in which an exclusive property or privilege is claimed are defined as follows:

1. A submarine optical fiber cable line comprising:
   an opto-electronic repeater having a water-tight envelope, said envelope being made of materials and having dimensions which permit it to withstand stresses imparted to it while it is being laid underwater and after it is laid underwater;
   at least two submarine optical fiber cables connected at their ends to, respectively, one end of said repeater and the other end of said repeater, at least one of said cables connected to said repeater being an optical fiber cable having a central rope capable of withstanding the stresses imparted to the cable during laying, having longitudinally extending optical fibers disposed around said rope and having a sheath around said optical fibers, said one cable being without armor outside said optical fibers capable of withstanding, by itself, the stresses imparted to said one cable during laying and after it is laid; and
   a tubular body intermediate and interconnecting said one cable with said repeater, said tubular body being mechanically connected at one end to said envelope, being mechanically connected at its other end to said sheath and having a strength sufficient to withstand the stresses imparted thereto by said repeater and said one cable and by the water in which it is laid, said tubular body having a rigid partition secured thereto and extending transversely to the bore of said tubular body, said partition being mechanically connected to said rope and having a strength sufficient to withstand the stresses imparted to said rope during the laying of said one cable and after it is laid and said partition having at least one through-opening for the passage of said optical fibers of said one cable.

2. A submarine line as set forth in claim 1 further comprising fluid sealing means within said tubular body for preventing axial flow of fluid in the bore of said tubular body.

3. A submarine line as set forth in claim 1 wherein said tubular body comprises at least two tubular sections, wherein said partition is a plate intermediate said sections and extending transversely to the axes of said sections, said sections being mechanically secured to each other and holding said plate therebetween and wherein there are securing means secured to said rope and to said plate for mechanically connecting said rope to said plate and withstanding the stresses applied thereto by said rope.

4. A submarine line as set, forth in claim 2 wherein said plate has a through-hole which said rope extends and said securing means comprises a pair of clamps respectively at opposite sides of said plate and clamped onto said rope, at least one of said clamps engaging said plate.

5. A submarine line as set forth in claim 2 wherein said repeater has optical fibers extending therefrom into said tubular body and said one cable has its optical fibers extending into said tubular body and wherein said fluid sealing means comprises a sealing body of polymeric material between said optical fibers extending from said repeater and said optical fibers extending from said one cable, said sealing body being in water-tight engagement with said tubular body and having a plurality of axially extending optical fibers embedded therein with end portions thereof extending from opposite ends of said sealing body, the last-mentioned said optical fibers having respective end portions connected respectively to said optical fibers extending from said repeater and to said optical fibers extending from said one cable.

6. A submarine line as set forth in claim 4 wherein said sealing body is disposed intermediate said partition and said optical fibers extending from said one cable.

7. A submarine line as set forth in claim 5 wherein said tubular body comprises three tubular sections, a first section being connected to said repeater, a second section being connected to said sheath and a third section being disposed intermediate and being connected to and held between said first section and said second section and wherein said sealing body substantially fills said third section.

8. A submarine line as set forth in claim 1 wherein any otherwise empty space within said tubular body is filled with a water-repellent grease.

* * * * *